United States Patent
Lebrun

(10) Patent No.: US 10,847,139 B1
(45) Date of Patent: Nov. 24, 2020

(54) CROWD SOURCED BASED TRAINING FOR NATURAL LANGUAGE INTERFACE SYSTEMS

(71) Applicant: Facebook, Inc., Menlo Park, CA (US)

(72) Inventor: Alexandre Lebrun, Paris (FR)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/667,606

(22) Filed: Oct. 29, 2019

Related U.S. Application Data

(63) Continuation of application No. 14/686,771, filed on Apr. 14, 2015, now abandoned.

(60) Provisional application No. 61/980,355, filed on Apr. 16, 2014, provisional application No. 62/020,354, filed on Jul. 2, 2014, provisional application No. 62/050,073, filed on Sep. 12, 2014.

(51) Int. Cl.
*G06F 3/16* (2006.01)
*G06F 17/28* (2006.01)
*G10L 15/18* (2013.01)
*G10L 15/06* (2013.01)
*G06F 40/35* (2020.01)

(52) U.S. Cl.
CPC .............. *G10L 15/18* (2013.01); *G06F 40/35* (2020.01); *G10L 15/063* (2013.01)

(58) Field of Classification Search
CPC ..... G06F 3/167; G06F 17/279; G10L 15/063; G10L 15/18
USPC .......................................................... 704/9
See application file for complete search history.

(56) References Cited

U.S. PATENT DOCUMENTS

| | | | |
|---|---|---|---|
| 9,401,142 B1* | 7/2016 | Rothwell | G06Q 50/01 |
| 9,436,738 B2* | 9/2016 | Ehsani | G06F 8/41 |
| 2003/0055655 A1* | 3/2003 | Suominen | G06F 3/167 |
| | | | 704/276 |
| 2003/0105589 A1* | 6/2003 | Liu | G06F 16/40 |
| | | | 702/1 |
| 2004/0215663 A1 | 10/2004 | Liu et al. | |
| 2004/0220925 A1 | 11/2004 | Liu et al. | |
| 2009/0254336 A1* | 10/2009 | Dumais | G06F 9/451 |
| | | | 704/9 |
| 2011/0276396 A1* | 11/2011 | Rathod | H04L 12/18 |
| | | | 705/14.49 |
| 2013/0304758 A1* | 11/2013 | Gruber | G06F 16/248 |
| | | | 707/769 |
| 2014/0201126 A1* | 7/2014 | Zadeh | A61B 5/165 |
| | | | 706/52 |

(Continued)

*Primary Examiner* — Edwin S Leland, III
(74) *Attorney, Agent, or Firm* — Fenwick & West LLP

(57) ABSTRACT

A crowdsourcing based community platform includes a natural language configuration system that predicts a user's desired function call based on a natural language input (speech or text). The system provides a collaboration platform to configure and optimize quickly natural language systems to leverage the work and data of other developers, thus minimizing the time and data required to improve the quality and accuracy of one single system and providing a network effect to reach quickly critical mass of data. An application developer can provide training data for training a model specific to the developer's application. The developer can also obtain training data by forking one or more other applications so that the training data provided for the forked applications is used to train the model for the developer's application.

15 Claims, 10 Drawing Sheets

(56) References Cited

U.S. PATENT DOCUMENTS

| | | | | |
|---|---|---|---|---|
| 2014/0244254 A1* | 8/2014 | Ju | ........................ | G10L 15/063 |
| | | | | 704/243 |
| 2014/0278413 A1* | 9/2014 | Pitschel | .................. | G10L 15/22 |
| | | | | 704/243 |
| 2015/0100943 A1* | 4/2015 | Gabel | .................... | G06Q 30/02 |
| | | | | 717/106 |
| 2015/0112765 A1* | 4/2015 | Sundaresh | ............. | G06Q 50/01 |
| | | | | 705/7.31 |
| 2015/0234807 A1* | 8/2015 | Phillips | .................. | G06F 40/40 |
| | | | | 704/9 |
| 2015/0301795 A1* | 10/2015 | Lebrun | ................. | G10L 15/063 |
| | | | | 704/9 |
| 2015/0317302 A1* | 11/2015 | Liu | ................... | G06F 16/90332 |
| | | | | 704/9 |

* cited by examiner

CROWD SOURCED BASED TRAINING FOR NATURAL LANGUAGE INTERFACE SYSTEMS

CROSS REFERENCE TO RELATED APPLICATIONS

The application is a continuation of co-pending U.S. application Ser. No. 14/686,771, filed Apr. 14, 2015, which claims the benefit of Provisional Application No. 61/980,355, filed on Apr. 16, 2014, the benefit of Provisional Application No. 62/020,354, filed on Jul. 2, 2014, and the benefit of Provisional Application No. 62/050,073, filed on Sep. 12, 2014, all of which are incorporated herein by reference.

BACKGROUND

This application relates in general to the field of natural language processing, and in particular to an email-like user interface and a crowd-source based network for configuring and training a natural language system interfaced with a runtime system or application.

Voice control of devices such as wearable and other computing devices is becoming increasingly popular. Enabling voice control requires a natural language system in addition to a speech recognition system, which translate speech into textual input. The natural language system is capable of processing a user's natural expression into program code that the device's runtime system or an application running on the device understands. However, integration of a natural language system into an application running on wearable devices is often not feasible, since generic models lacking functionality specific to an application are not accurate enough for application-specific contexts. Furthermore, models customized for a particular application are very expensive to build and require large training data sets for accurately processing natural language. In particular, an application that perform complex task require a large training data set to train the natural language interface, since the application needs to correctly translate a large number of, for example, complicated natural language request into actionable commands.

SUMMARY

A system provides an email-like user interface ("inbox") to configure and train natural language (NL) configuration systems. An NL configuration system allows a runtime system or application to process natural language expressions into program code or an application function that the runtime system or application can execute. The processing of natural language expression includes the runtime system or application communicating the expression in form of a NL query to the NL configuration system, which in turn predicts a user's intent based on the NL query. The NL configuration system associates the predicted intent with a program code or application function, which it communicates back to the runtime system or application for execution.

Upon processing natural language expressions, runtime systems and applications generates a plurality of user logs that are received by a developer platform. Each user log includes one or more natural language expression in form of an NL query and the intent predicted by the NL configuration system based on the natural language expressions. The developer platform's inbox allows for minimizing the number of human interactions required to improve the quality and accuracy of an NL configuration system in processing natural language expressions. From the received user logs, the inbox determines at least a filtered, grouped or sorted list of user logs. The inbox allows the developer to input specific parameter to filter, sort, and group the received user logs. The inbox displays a plurality of action panels in an inbox view. Each displayed action panel is associated with one or more different user log of the list of user logs and includes the natural language expression and the intent of the associated user log. The inbox further displays to the developer for each action panel an option to validate or dismiss the associated user log. When a developer selects the option to validate a particular user log, the developer platform configures and trains the corresponding NL configuration system based on the natural language expression and the intent of the validated user log. In some embodiments, the developer platform includes an Application Programming Interface (API) server that configures and trains the NL configuration system by automatically processing received user logs.

The system may be further configured to leverage a crowd-sourcing community of developers to efficiently create a customizable NL configuration system. The system uses a training interface as part of the developer platform and includes maintaining a plurality of natural language (NL) instances. As such, the plurality of NL instances forms a network of NL instances. Each NL instance includes a set of training data and a prediction model as part of an NL configuration system that predicts a user-desired application function based on an NL query. Upon receiving one or more requests by developers to link NL instances to other NL instances, the developer platform links one or more NL instances to one or more other NL instances within the network. The NL configuration systems associated with the NL instances then train each of the NL instances in the network based at least in part on: the training data for the NL instance and the training data for any other NL instances to which the NL instance is linked. In addition, for each of one or more of the plurality of NL instances the NL configuration systems associated with each NL instance receive a request for the NL instance to provide a user-desired application function based on a user-provided NL query. The NL configuration systems associated with each NL instance use each NL instance's prediction model to determine an application function according to the prediction model and respond to the received request with the determined application function. In some embodiments, the response includes communicating the application function to the device of the user, and in turn to the application for execution. The NL configuration systems are domain agnostic and based on actual end-users' interactions validated by each developer in the community for their own NL configuration system, thus minimizing the time required to bootstrap and improve such a system.

The advantages of this method include, without limitation, that it is simple and fast to start a new configuration of a NL configuration system leveraging the work and configurations from a community of developers. In a single step, accepting suggested instances from network of instances, a developer can fork all or part of existing NL configuration systems and leverage the work and experience from other developers.

The training interface of the NL configuration system encourages the sharing and collaboration between several developers working on implementing a natural language environment for a runtime system or application that process similar natural language expressions and intents. The NL configuration system creates a network of instances and ranks instances of NL configuration systems in terms of accuracy and quality.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Architecture of Natural Language Training Environment

Figure 1A:
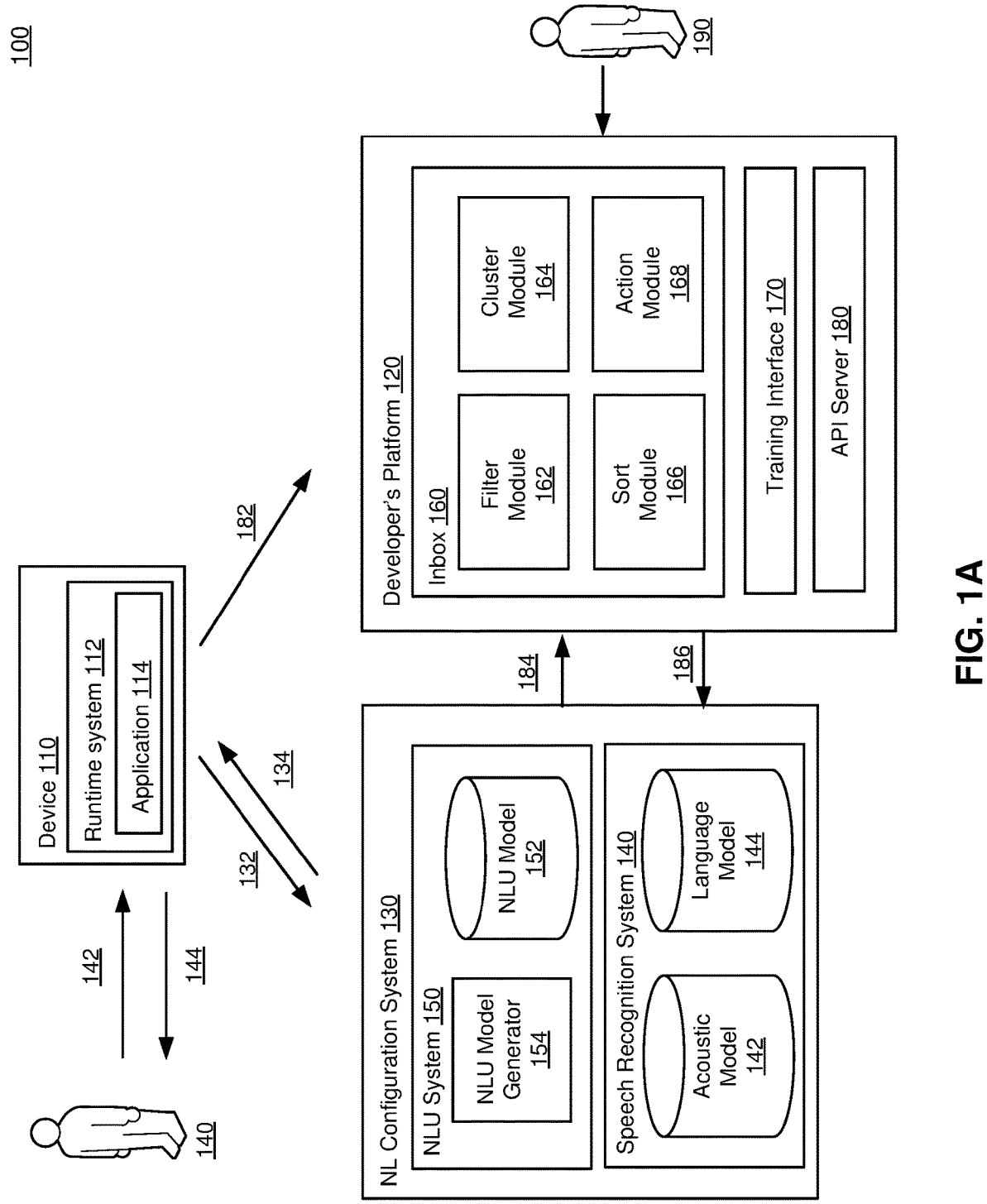
FIGS. 1A and 1B illustrate a natural language (NL) training environment configured to integrate a natural language system with a runtime system or application on a device, according to some embodiments.
Figure 1B:
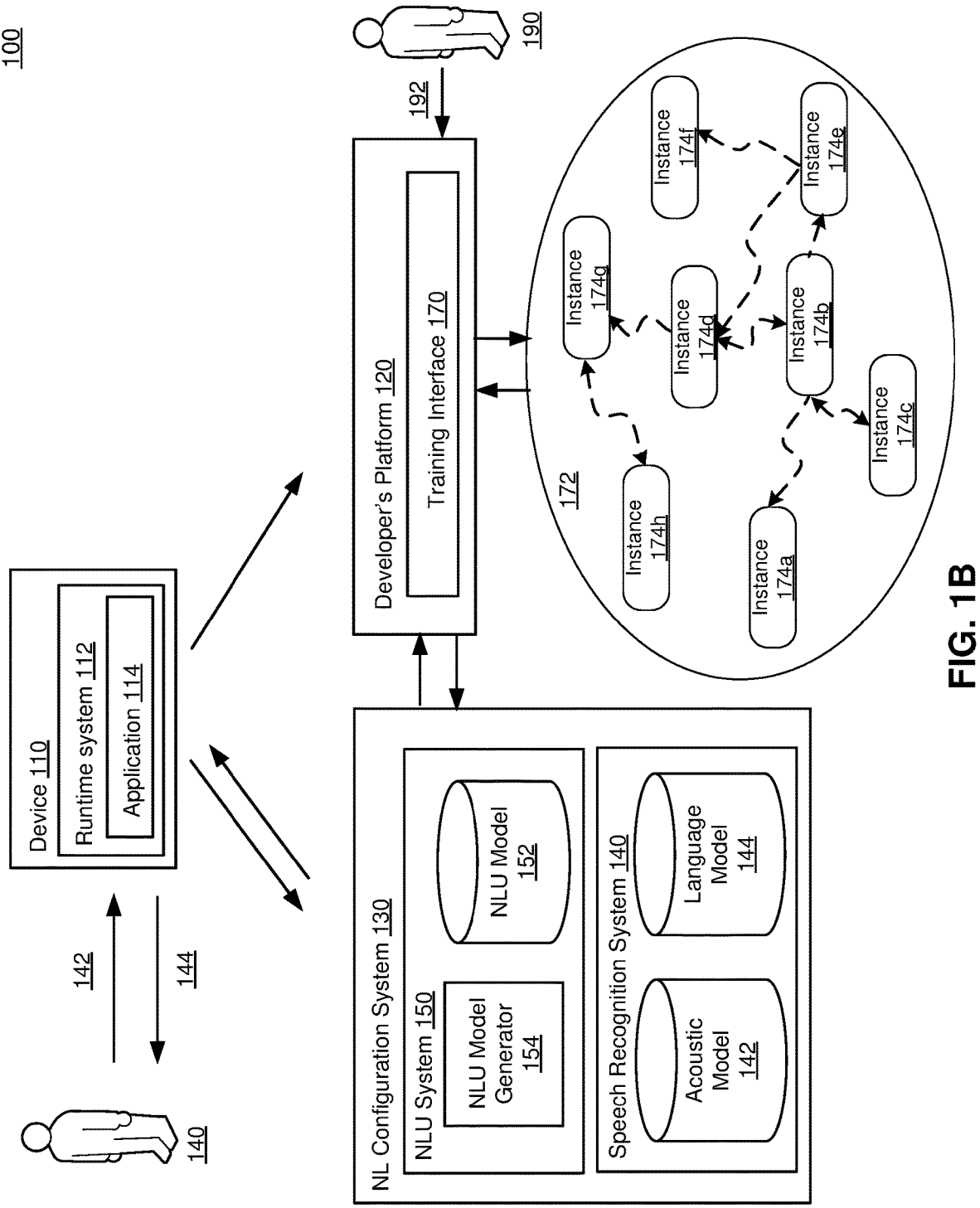

FIGS. 1A and 1B illustrate a natural language (NL) training environment 100, according to some embodiment. The NL training environment 100 facilitates the development of a natural language system or interface that translates an NL query by a human user into instructions that a computer is able to process. For example, the system translates the NL query into machine-readable code. An embodiment of the NL training environment 100 includes a number of different computing systems including a user's device 110, a developer platform 120 of a natural language system, and a natural language configuration system 130, all communicatively coupled through a communications network (e.g., the internet), and shown as arrows between the computing systems. For example, the computing systems may be programmed to communicate with each other using a networking protocol such as transmission control protocol/internet protocol (TCP/IP). In some embodiments, the communication network runs locally on the device and includes an internal data bus. Although the figures only show one of each type of computing system, in practice, many types of computing systems exist, and the various types of computing systems communicate with each other on a frequent basis.

In some embodiments, the developer platform 120 and the NL configuration system 130 are implemented using a server/client-side programming language, e.g., the Clojure development language. In one embodiment (not shown), in response to a user's natural language input the device communicates the input for processing to the NL configuration system 130 that runs on an external server. In this embodiment, the NL configuration system 130 is implemented on a server running a runtime system that communicates with the runtime system on the device. In another embodiments as shown in FIG. 1A, a runtime system locally processes the NL query of user 140 on the device 110 using the NL configuration system 130. In this embodiment, the NL configuration system 130 can be integrated with the runtime system 112 on the device 110. In yet another embodiment of a "hybrid" mode (not shown), the device 110 employs a runtime system including a NL configuration system that can process certain NL inputs by a user locally, but is also configured to communicate other NL inputs to a complimentary NL configuration system on a server.

As shown in FIGS. 1A and 1B, in some embodiments, the runtime system 112 invokes the NL configuration system 130, when the user 140 inputs 142 an NL query to the device 110, e.g., a smart phone, tablet computer, laptop computer, personal computer, navigation system, security system, etc. The runtime system 112 communicates 132 the NL query to the NL configuration system 130 for translating the NL query into computer instructions. Upon translation of the NL query, the NL configuration system 130 communicates 134 the translated computer instructions back to the runtime system 112. In some embodiments, runtime system 112 communicates the instructions to an application 114, which interacts with the user via user inputs, including NL queries. The NL configuration system 130 provides an interface between the NL query provided by a user and an application 114 that lacks the capability to translate or interpret such NL queries. In some embodiment, instead of directly communicating with the NL configuration system 130, the runtime system 112 communicates the NL query to an NL runtime system (not shown) that interfaces with the NL configuration system 130. The device's runtime system 112 establishes access to the NL runtime system (not shown) or the NL configuration system 130 through Application Programming Interface (API) calls. In some embodiments, the NL runtime system processes the NL query before communicating the NL query to the NL configuration system 130.

Natural Language Queries and Training

In some embodiments, the NL query includes a question, a command, a request, or combination thereof. Examples of NL queries include questions about the weather at a specified location, about results of sport's events, creation of a schedule reminder, a request for turning lights on at home, or a general greeting. The user inputs the NL query on the runtime system 112 through voice commands, touch-screen gestures, audio signals or keystrokes. An explicit form of an NL query includes as a natural language expression. Example expressions of a NL query for setting an alarm may include: "Wake me up at 6 tomorrow morning," "Set the alarm at 6 am," and "I'd like you to wake me up by 6 in the morning." In some embodiments, in response to the user inputting an NL query the runtime system 112 provides 144 the user with related information, including a text message or speech prompt based on the NL query, or performs a specific programmatic task. For sake of clarity, a reference to a user 140 may also refer to the user's device 110, e.g., a computer, and to both the user's actions executed using the device, as well as the device's actions responsive to the user's input, depending upon whichever (or both) is more appropriate given the context.

In some embodiments, the runtime system 112 receives the NL query directly from the user through the device 110, e.g. a microphone or keyboard, or indirectly through an application 114 running on the device 110. Example applications using embodiments of the NL training environment 100 include, but are not limited to, applications that remotely control services or devices through SMS-based or IM-based messages and voice commands. Other example applications using the NL training environment 100 include schedule reminders, calendar applications, search applications of database entries, and applications interfacing with robotic machines through command dialogs. The runtime system 112 is configured to processes an NL query inputted in the form of a natural language expression that is directed at the application 114 by invoking the NL configuration system 130.

The runtime system 112 uses the NL configuration system 130 to process the natural language expression of the inputted NL query into program or machine-readable code, computer instructions, or constructs that the runtime system is capable of interpreting or executing. The code, instructions or constructs represent the intent of the NL query that the runtime system 112 and/or the application 114 can understand. For an application 114, the intent also represents a user-desired application function. In turn, the intent represents one or more actions that an expression represents for the runtime system 112 and/or the application 140. When presented with a particular intent, the runtime system 112 and/or the application 140 perform the actions associated with the intent. Since an NL query can correspond to multiple different natural language expressions, the one or more expressions are associated with the intent predicted from the NL query.

Based on user-inputted natural language expressions the NL configuration system 130 is trained to determine the user's intents and associate the appropriate actions with these intents. Upon training, the NL configuration system 130 predicts the intent based on a user-inputted natural language expression. As described above, the system can group multiple natural language expressions together to form a single NL query and associates an intent with the grouped query. In this disclosure, NL query and natural language expression are used interchangeably, unless otherwise stated. In some embodiments, each user's intent corresponds to a unique action that the runtime system 112 or the application 114 performs in response to a user-inputted NL query. Since the user's intent is expressed in natural language format, the NL configuration system is capable of interpreting a large number of inputted NL queries, through which an end-user expresses an intent. By interpreting a user's intent the NL configuration system 130 maps the user's expression onto an action. In some embodiment, the developer previously defined the action within the NL training environment 100. For example, for setting an alarm the NL configuration system 130 maps the inputted NL query to the intent "set_alarm" that represents an action that the runtime system 112 or application 114 is capable of interpreting or executing. In this example, the runtime system 112 or application 114 receives an API call for interpreting or executing an alarm function within the runtime system or the application.

As shown in FIG. 1A, in some embodiments, the NL configuration system 130 includes a speech recognition system 140 and a natural language understanding (NLU) system 150 to translate an NL query into an action. The speech recognition system 140 translates sound expressions into textual expressions. To translate sound expressions into textual expressions the speech recognition system 140 employs an acoustic model 142 and a language model 144.

In some embodiments, the runtime system 112 supplies the speech recognition system 140 with the language used for the translation. In some embodiments, the developer sets a default language in the developer's platform 120 that the speech recognition system 140 then uses for the translation. Accordingly, the speech recognition system 140 uses the language model 144 that corresponds to the supplied language. In turn, the natural language understanding (NLU) system 152 processes the textual expression from the speech recognition system 140 or the runtime system 112 into a program code or construct. To process a textual expression received from the speech recognition system 140 or directly from the runtime system 112, the NLU configuration system uses a NLU model 152 generated by a NLU model generator 154. The NLU model generator 154 uses machine-learning techniques to generate and train the NLU model 152. In some embodiments, the NLU model generator 154 applies machine learning techniques to generate the acoustic model 142 and language model 144 based on a selected set of model features with each model.

The NLU model generator 154 may apply any machine-learning technique based on a selected set of model features with the model having a particular goodness, predictive error, and robustness. In some embodiments, machine-learning techniques include supervised, semi-supervised, or unsupervised semi-supervised machine-learning algorithms that are well known in the art. In some embodiments, the model generator 154 also calculates the confidence for a particular combination of input query and predicted program code/construct (the intent of the query) based on each NL model, i.e. NLU model 152, the acoustic model 142, and the language model 144, or any combination thereof. In some embodiments, the NLU model generator 154 calculates the confidence for a particular combination of input NL queries and predicted intents of the queries, including the associated actions, i.e. program code, machine-readable instructions or constructs. A confidence value represents the likelihood that an outcome, i.e. the predicted intent for a query, is associated with feature X. Generally, confidence and support are used in association rule learning to identify association rules, i.e. implications of the form among non-overlapping variables within a dataset.

Email-Like User Interface ("Inbox")

Referring to FIG. 1A, in some embodiments, the developer platform 120 of the natural language training environment 100 includes an inbox 160 and an Application Programming Interface (API) server 180. The inbox 160 has an email-like user interface for the developer to interact with and the NL configuration system 130 and the API server 180. In some embodiments, the developer platform optionally includes a training interface 170 that provides an interface to a network of NL instances. An NL instance refers a particular implementation of an NL configuration system that its developer shares with other developers over the network. Another developer can use various shared NL instances to build and maintain his own NL configuration system 130. In some embodiments that include a training interface, the interface 170 is accessible through the inbox 160 so that the inbox provides an integrated interface for the developer.

The developer platform 120 facilitates the development and training of the NL configuration system 130, including the speech recognition system 140 and the NLU system 150. The training of the systems can be based in part on input by the developer and user logs received by the platform from the devices. The user logs include one or more NL queries, the queries' intents and associated actions performed by the runtime system 112 and/or application 114 in response to the NL queries. The runtime system 112 and/or application 114 generate the user logs based on the configuration state of the NL configuration system used by the system 112 or application 114. Upon receiving 142 a user's NL query the runtime system 112 or application 114 sends 132 the query to the NL configuration system 130 that determines the intent of the query based on its models, including the NLU model 152, the acoustic model 142 and/or language model 144. The NL configuration system 130 then sends 184 the determined intent and corresponding NL query to the API server 180. Based on the intent, the NL query, and from which runtime system and/or application the NL query originated the API server 180 determines an action for the runtime system and/or application to perform. The API server 180 sends back the determined action to the NL configuration system 130, which receives 186 and redirects 134 the action to the device 110 that runs the runtime system 112 and/or application 114. The runtime system 112 and/or application then performs the action and records the results of the action, which action was performed, the NL query, predicted intent and other configuration parameters of the NL configuration system 130 in a user log.

In some embodiments, the developer platform 120 is implemented in form of a web console that allows the developer 190 to configure the NL configuration system 130. The web console in turn is associated with a particular Universal Resource Locator (URL), to which the runtime system 112 and the NL configuration system 130 sends communication between the platform and the systems. In some embodiments, the API server 180 is associated with a unique URL address and automatically generates an action, in form of for example an API request, based user logs received 182 from the runtime system 112 or application 114. In some embodiments, API server 180 sends the generated action in JavaScript Object Notation (JSON) format. As described above, in some embodiments, the action includes a program code, machine-readable instruction and/or constructs that the runtime system 112 and/or application 114 can execute or interpret. In some embodiments, the action includes a message identifier, a body of the message, an intent identifier, a confidence value, and entity values associated intent identifier. In some embodiments, the entity values include a start value, an end value, a current value, and entity identifier. In some embodiments (not shown), the API server directly communicates the determined action to the device 110, including the runtime system 112 and/or application 114. In some embodiments, upon receiving 186 the action the NL configuration system 130 updates its models used to process/translate a natural language expression into an intent associated with an action.

The inbox 160 includes a filter module 162, a cluster module 164, a sort module 166, and an action module 168 and is configured to display a set of user logs received by the developer platform 120. User logs are generated by the NL configuration system in response to receiving an NL query from the runtime system 112 and/or the application 114 and are send 182 to the developer platform 120. The user log includes the NL query and the intent that the NL configuration system predicts from the NL query, and other configuration parameters of the NL configuration system 130. The parameters in some embodiments include the NLU model 152, and in case of sound expressions the acoustic model 142 and the language model 144 of the speech recognition engine. In some embodiments, user logs include a textual or sound expression of the NL query. In some embodiments, a NL query recorded in a user log is associated with the predicted intent and the models used by NL configuration system to predict the intent. In some embodiments, statistics of the prediction and specifics of the machine-learning techniques of predicting an intent for the NL query are recorded in the user logs. The prediction statistics and specifics are also associated with the corresponding NL query in the user logs.

The filter, cluster and sort module determine which and in what order user logs are displayed in the inbox 160. The filter module 162 allows the developer to reduce the number of displayed user logs by applying filter criteria to the received user logs. The cluster module 164 combines a number of user logs into groups of user logs, allowing the developer to select a specified group of user logs. The sort module 166 allows the developer to sort user logs according to user-specified or pre-determined search criteria. Filtering, grouping and sorting of the user logs in the inbox 160 depends on the configuration state of the NL configuration system 130, including the current state of the NLU model. In some embodiments, a new query inputted by the user alters the configuration state of the system 130, and thus the display of user logs in the inbox 160.

The action module 168 determines the action initiated by the developer in validating or dismissing a user log and communicates/sends 186 the action to the NL configuration system 130. In some embodiments, a developer can initiate an action through the action module 168 on a group of user logs as the corresponding user logs are arranged in groups in the inbox view. Upon receiving an action because of the developer validating or dismissing a user log, the NL configuration system 130 retrains the NLU model based on the content of the action and the number of previously received actions. In some embodiments, the developer can specify the numbers of actions triggering a retraining of one or more model, which for example includes the NLU model 152, the acoustic model 142, and the language model 144. In some embodiments, the NL configuration system 130 retrains the speech engine that includes the acoustic and language model to predict a textual expression from a sound expression with higher confidence.

In some embodiments, the user 140 provides additional information that is displayed to the developer through the inbox 160 of the developer platform 120. For example, when observing the response of the runtime system 112 and/or application 114 upon providing an NL query the user can grade his experience. In some embodiments, the developer can use this additional information to generate or retrain the models of the NL configuration system 130. This information includes the user's natural language expressions associated with the user-provided NL query and the subsequent action communicated 134 by the NL configuration system 130 to the device 110 in response to these queries. In some embodiments, the runtime system 112 directs this information to the NL configuration system 130 that uses it to retrain the NLU model 152, and in some embodiments, the acoustic model 142 and language models 144 of the speech recognition engine 140.

In some embodiments, when retraining its models the NL configuration system 130 uses the user-provided grade with the confidence score of each natural language expression and intent combination. Accordingly, the NL configuration system 130 increases or decreases the combination's significance in training its models based on a higher or lower grade, respectively. In some embodiments, the grade is weighted based on other characteristics of the user who is providing the grade. For example, the developer may assign a user and/or user logs originating from a particular device with a higher weight based on the developer's assessment of the user's grading experience. In some embodiments, when displaying the user logs, the user's grade and other grading characteristics are displayed in the inbox 160, too. For example, these grading characteristics may include if the developer previously accepted grades from this particular user and/or device and the number of accepted grades in addition to the corresponding NL query, predicted intent and associated action. In some embodiments, the runtime system 112 sends 182 the user-provided information in addition to the user logs to the developer platform 120, which further communicates this information to the API server 180. In some embodiments, the API server 180 automatically generates an action, in form of for example an API request, for each combination included in the information and sends 186 the action to the NL configuration system 130. The API server 180 may selects the action based on the grade provided by the user 140. In some embodiments, third parties (not shown), e.g., Amazon Mechanical Turk workers, grade the performance of the NL configuration system 130, and in addition may provide the corresponding actions to the NL configuration system in form of API requests.

In some embodiments, the inbox 160 allows the developer to retrain the acoustic and language model of the speech recognition engine 140 by presenting the sound expression in a user log to the developer. The developer can listen to the presented sound expression and validate or dismiss the textual expression generated (transcribed) by the speech recognition engine. The developer platform 120 then displays the generated textual expression along with the sound expression in the inbox. In some embodiments, the developer can edit the textual expression generated from the sound expression before validating the edited textual expression. In some embodiments, the developer can tag sound expression for particular characteristics of the expression, e.g., the speaker's emotions or identity. In some embodiments, the speech recognition engine automatically detects these characteristics. The developer platform then displays these characteristics in the inbox along with the sound expression for the developer to validate or dismiss. For example, the inbox view displays an emotion icon next to sound expression in form of a "Happy Face" to indicate a positive emotion of the speaker or of a "Sad Face" for negative emotions. In another example, the inbox displays a picture or a name of the user 140 identified by the speech recognition engine to be the speaker of the sound expression. In some embodiments, the NLU model generator uses the tagged characteristics to train the acoustic and language model of the speech recognition engine 140. In some embodiments, the NLU model generator adjusts the confidence value for sound expression of positive emotions compared to negative emotions, if the developer more frequently validates without editing expressions of positive emotions over those expression tagged as negative. In some embodiments, the NLU model generator maintains different NLU models for each user 140 based on the tag of the speaker's identity. One benefit of per-user NLU models includes more reliably handling a user's vocal patterns, such as intonation, pronunciation, stress and accents in a user's voice.

Crowd-Source Based Network of Natural Language Instances

As shown in FIG. 1B, in some embodiments, the NL configuration system 130 includes a training interface 170 that provides an interface to a plurality of NL instances 174 that form a network 172 of NL instances. The training interface 170 allows a developer to identify and retrieve content from NL instances 174 included in the network 172 to build and/or train his own NL configuration system. Developers can share NL instances among themselves over the network to build and maintain their own NL configuration systems. An NL instance includes a set of the training data and a prediction model used to predict an intent based on a NL query. In case that the NL query directed at an application 114, the intent also represents a user-desired application function. In this case, the prediction model is capable of predicting a user-desired application function. In some embodiments, the intent For example, a prediction model include the NLU model of an NLU system or the acoustic model and language model of a speech recognition system, as described with respect to FIG. 1A. In some embodiments, an NL instance includes one or more prediction models. The training data of an NL instance refers to NL queries used to train the corresponding prediction model. In some embodiments, the training of NL configuration system is based on NL queries, predicted intents, user logs, and/or input by a developer validating or dismissing the combination of a NL query and its predicted intent, which is described in detail above.

When building a NL configuration system, in some embodiment, the training interface receives 192 a request from a developer to link his NL instance to other NL instances included in the network. An NL instance refers to a particular implementation of a developer's NL configuration system, including the system's configuration state. In some embodiments, an NL instance is dynamic in time, since the NL configuration system is continually updated and/or retrained. For example, the NLU model is retrained based on received user logs as described in detail with respect to FIG. 1A. The developer can use NL instances 174 included in the network 172 to retrain the NLU model 152 and, in some embodiments, the models of the speech recognition engine 140.

To use other NL instances for building a NL configuration system, the training interface links 176 one or more NL instances 174 included in the network 172 in response to the received request by the developer. In some embodiments, the NL configuration system automatically identifies NL instances included in the network 172, links the identified NL instances, and uses these linked NL instances to retrain one or more of prediction models of these NL instances. The identification may be based on a similarity measure between the NL instances included in the network 172. In some embodiments, a similarity measure is based on string comparison of the natural language expressions included in NL queries of the training data of the NL instances. In some embodiments, NL instances of the same NL configuration system are included in the network 172 with the instances representing different snapshots of the system in time. NL instances 174 are accessible by developers of other NL configuration systems and vice versa through the network 172, and changes to an NL instance are communicated to all other linked NL instances in the network. In some embodiments, the training interface 170 provides the developer with accessibility, including relevant information, to NL instances 174 of the network 172 to assist the developer in deciding whether to include this NL instance into the developer's NL configuration system 130.

Figure 2:
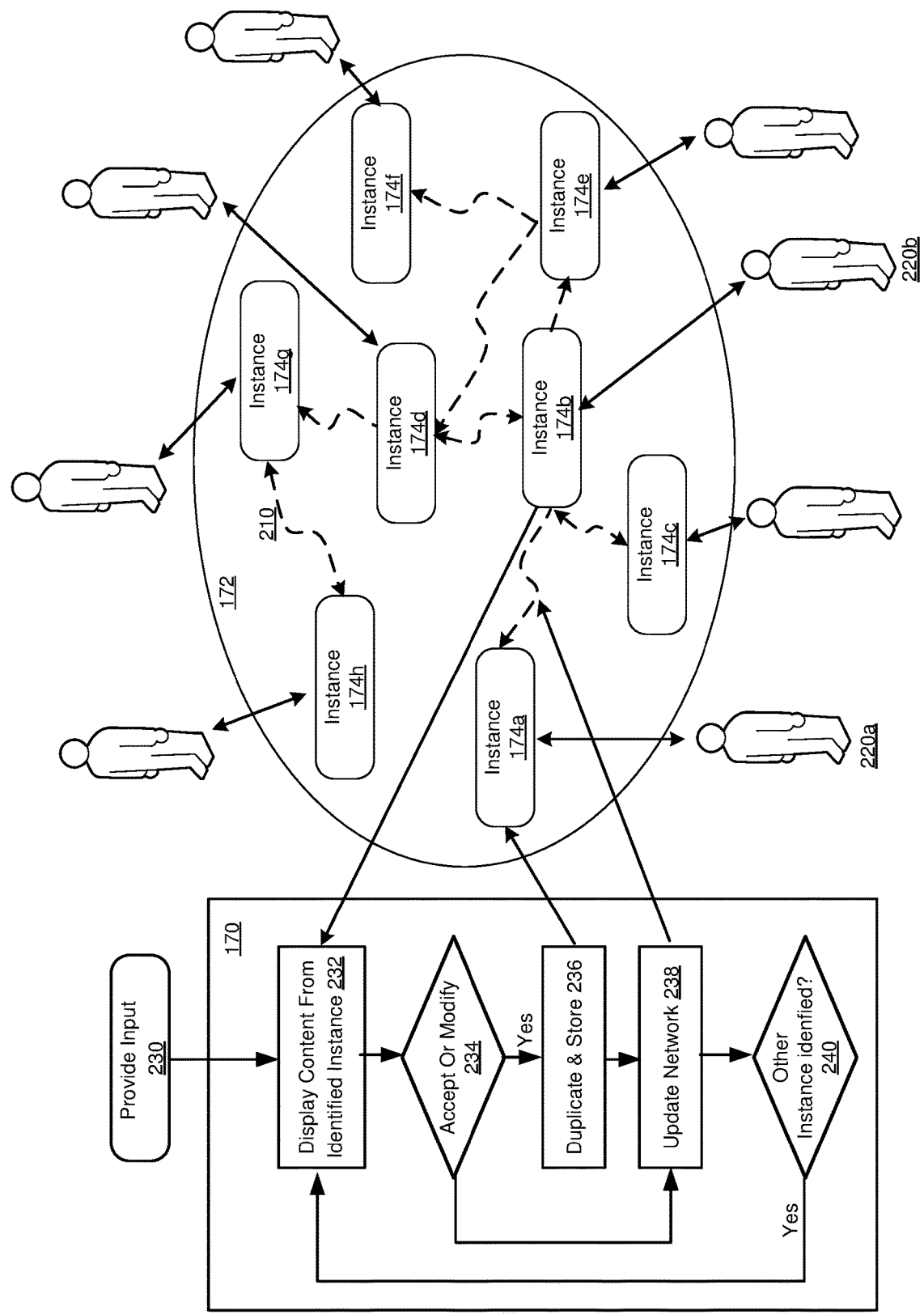
FIG. 2 illustrates a crowd-source based network of instances associated with different NL configuration systems and developers within the NL training environment, according to an embodiment.

As shown in FIG. 2, in some embodiments, the network 172 includes a plurality of linked NL instances 174 provided by a community of developers. By building one or more NL configuration systems a developer can contribute multiple NL instances to a network. In the network, each NL instance 174 can be linked to one or several other NL instances 174. A directed link 210 between two NL instances 174a and 174*b* means that at some point in the past, some content, e.g. the training data and/or prediction model, associated with one of the NL instances 174*a* was used by a developer 220*a* of the other NL instance 174*b*. Each of the linked NL instances are trained at least in part on its own training data and the training of any other NL instance to which the NL instance is linked.

For example, the link between NL instances 174*a* and 174*b* is established as follows: Upon the receiving 230 a linking request by a developer 220*a*, the developer platform identifies one or more NL instances, including instance 174*a*, based on the developer's NL configuration system and the received request. The training interface displays 232 the content from any identified NL instance to the developer 220*a*. In some embodiments, the training interface 170 filters, clusters and groups the identified NL instances for displaying to the developer similar to the user logs being filtered, sorted and grouped in the inbox 160 as described above. When the developer 220*a* then uses the content of the displayed NL instance 174*a*, e.g. the training data and/or prediction model, to build his own NL configuration system associated with instance 174*b*, the developer platform links the two NL instances.

An arrow indicates the direction of the link. The direction represents which of the linked NL instance was used to train the other of the two NL instances that are linked. For the shown instances 174*a* and 174*b*, instance 174*a* was used to train instance 174*b* as the arrow points from 174*a* to 174*b*. For example, the developer 220*a* may use an example of a voice command and the translated textual expression provided in NL instance 174 to build or improve the speech recognition system of his own NL configuration system. In some embodiments, an NL instance 174 is ranked among other instances of the network 172 based on the number of links that the instance has with all other instances included in the network. Other ranking criteria may include the frequency that are instance is being forked or re-used by developers or whether the instance is owned by a developer who is considered a top contributor to network.

In some embodiments, the training interface 170 provides a search functionality that allows a developer to search the network 172 for a particular NL instance. A search can include categories or types of intents or text-based matching of the search term with a natural language expression and a text string that identifies an intent. In some embodiments, the training interface identifies an NL instance based a similarity measure as describe above or the popularity of the NL instance among other developers. The training interface displays 232 the content from identified NL instances to the developer 220*a* to be included in his own NL configuration system. In some embodiments, the training interface displays the entire content of the identified NL instance or only its relevant parts. For example, the interface 170 only displays the content of synonymous expressions to the one entered by the developer 220*a* in his linking request. The developer 220*a* may then either accept or modify 234 the content for building his own NL configuration system associated with NL instance 174*a*.

The developer 220*a* may decide based on indicators whether to accept or modify 234 all or part of the content of a displayed NL instance. Such indicators include, for example, the similarity of the content, the freshness of the content, and its popularity amongst the community. If the developer 220*a* rejects 235 the content, the corresponding NL instance 174*b* is tagged to indicate a rejection by a developer. Using any rejection-tagged NL instances the training interface 170 avoids identifying other NL instances, having the same or similar content, to be displayed to the developer 220*a* in the future. If the developer 220*a* accepts all or part of the displayed content, the corresponding NL instance is tagged to indicate an acceptance by a developer. Accepted NL instance receive a higher rank than other similar NL instances in the network. The number of links of an NL instance is directly correlated to the rank of the instance within the network. The training interface is more likely to provide content of higher ranked instance in the future to a developer, e.g., when the instance is updated or retrained.

Upon accepting an instance, the training interface 170 duplicates 236 the accepted content, including the date and source of the corresponding NL instance, and stores 236 the duplicated content with the developer's NL configuration system. Duplicating the content allows for later synchronizing accepted content with the corresponding NL instance, when the instance's owner, i.e. the original developer, provides an updates to the NL instance. In addition, the training interface updates 238 the network of NL instances. This update includes tagging the accepted or rejected NL instance in addition to linking and ranking the NL instances based on the developer's acceptance or rejection. If the training interface identifies 240 more than one instance to be displayed to the developer, in some embodiments, the content of the other identified instances is sequentially displayed allowing the developer to again accept/modify or reject the displayed content. In some embodiments, subsequently updating an accepted instance also updates the recorded synchronization time. In some embodiments, the user browses through the one or more identified NL instances using the training interface 170. For example, if the developer 220*b* updates the instance 174*b*, the training interface communicates the change to the developer 220*a* who previously accepted instance 174*b* as illustrated by the dashed arrow in FIG. 2.

Figure 3:
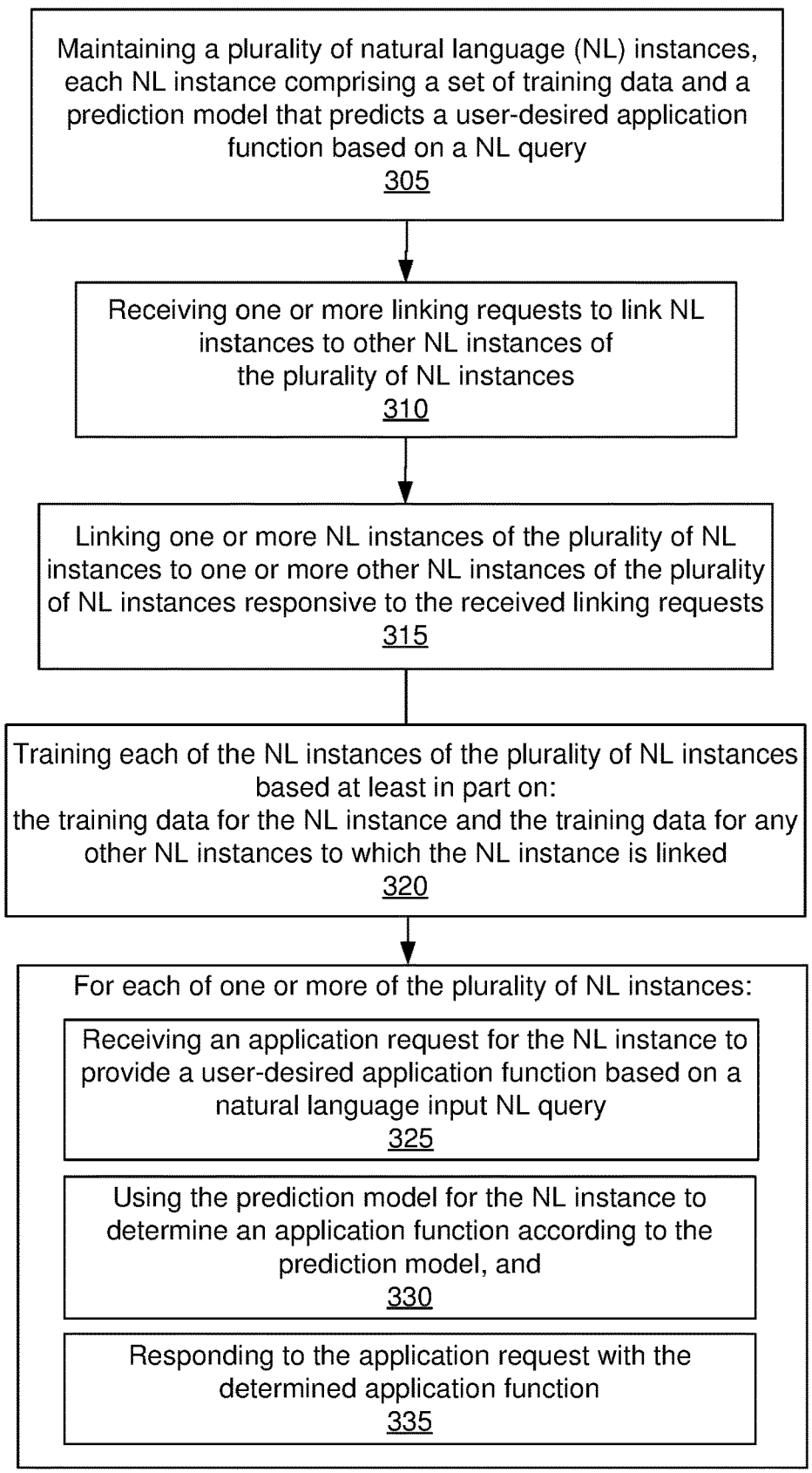
FIG. 3 illustrates a flow chart of a method for creating and training a NL configuration system using a network of NL instances, according to an embodiment.

FIG. 3 is a flow chart illustrating a method for creating and training an NL configuration system using a network of NL instances, according to an embodiment. The developer platform 170 maintains 301 a plurality of NL instances that each includes a set of training data and prediction model. Using the training data and prediction model the developer platform is configured to predict an intent based on an NL query. In case the NL query is directed to an application 114, the predicted intent can refers to user-desired application function. In response to a user inputting an NL query to the device 110 running the application 114, the NL configuration system 130 communicates the predicted user-desired application function back to the device 110 for the application 114 to execute. When creating or training an NL configuration system, the developer platform through its training interface may receive 303 one or more requests from the developer to link NL instances among the plurality of NL instances maintained by the platform.

Upon receiving such requests, the developer platform links 306 the one or more NL instances to other NL instances among the plurality of NL instances. The developer platform then trains 308 each of the linked NL instances based at least in part on the training data and prediction model of any other NL instances linked to the to-be-trained NL instance. In some embodiments, the training involves sending a training request to the NL configuration systems associated with the to-be-trained NL instance. The NL configuration system then uses at least in part the training data and prediction model of the other linked NL instances to retrain the prediction model of the to-be-trained NL instance. In some embodiments, the prediction model includes an NLU model for an NLU system, an acoustic model or language model, the latter two models being part of a speech recognition system.

In addition, for each of one or more of the plurality of NL instances the NL configuration systems associated with each NL instance receive 312 a request for the NL instance to provide a user-desired application function based on a user-provided NL query. Prior to receiving such request, a user sends the NL query to an application running on the user's device, which communicates the NL query to the NL configuration systems associated with each NL instance. The NL configuration systems associated with each NL instance use 314 each NL instance's prediction model to determine an application function according to the prediction model and respond 316 to the received request with the determined application function. In some embodiments, the response includes communicating the application function to the device of the user, and in turn to the application for execution.

Forking of NL Instances

In some embodiments, a developer uses instances provided by the network 172 as the starting point to build a NL configuration system 130. For example, a voice-controlled home management system, the network of instances may provide instances that include intents and actions for manage lights, thermostats, blinds and other home devices. Creating an NL instance based on already existing NL instances is referred to as "forking" an NL instance or part of an NL instance, including particular intents and the intent's corresponding entities. Public NL instances can be forked by any developer, while a private NL instance can be forked by its owner or a developer who the owner has granted access to the private instance. In some embodiments, private instances are only visible to its owner and developers who were granted access by the owner. In some embodiments, the owner forks its own instances to create duplicate instances that can be used in different versions of an NL configuration system.

The training interface 170 is configured to share NL instances via the network 172 and/or browse public or accessible private NL instances. In some embodiments, the training interface 170 presents the developer with N: instances included in the network 172 for the developer to add to his own NL configuration system. The selection of instances that are presented to the developer may be based on whether expressions, intents and/or entities of the presented instances are related (similar) to expressions, intents and/or entities of instance that are already part of the NL configuration system.

In some embodiments, the developer browses through NL instances of the network 172 through the training interface 170. When browsing a shared NL instance the intents and entities associated with the shared instance can be viewed in a read-only mode. In some embodiments, the inbox 160 of other developers are not visible. In some embodiments, the owner of an NL instance can grant "write access" to other developers who can then edit the instance's intents and entities. In some embodiments, in response to granting "write access" the owner's NL configuration system forwards the instance to inbox 160 of the receiving NL configuration system. In some embodiments, in response to a developer forking an instance owned by another developer, user logs created by the other developer's NL configuration system are forward to the developer's inbox 160 for validation or dismissal. In some embodiments, the developer's action of validating or dismissing the user log only affects the forked instance, leaving the original instance of the other developer unchanged. In some embodiments, the developer's action affects both the forked and original instance, resulting in retraining of the NL configuration systems associated with both the forked and original instance.

Graphical User Interface for Natural Language Training Environment

Figure 4:
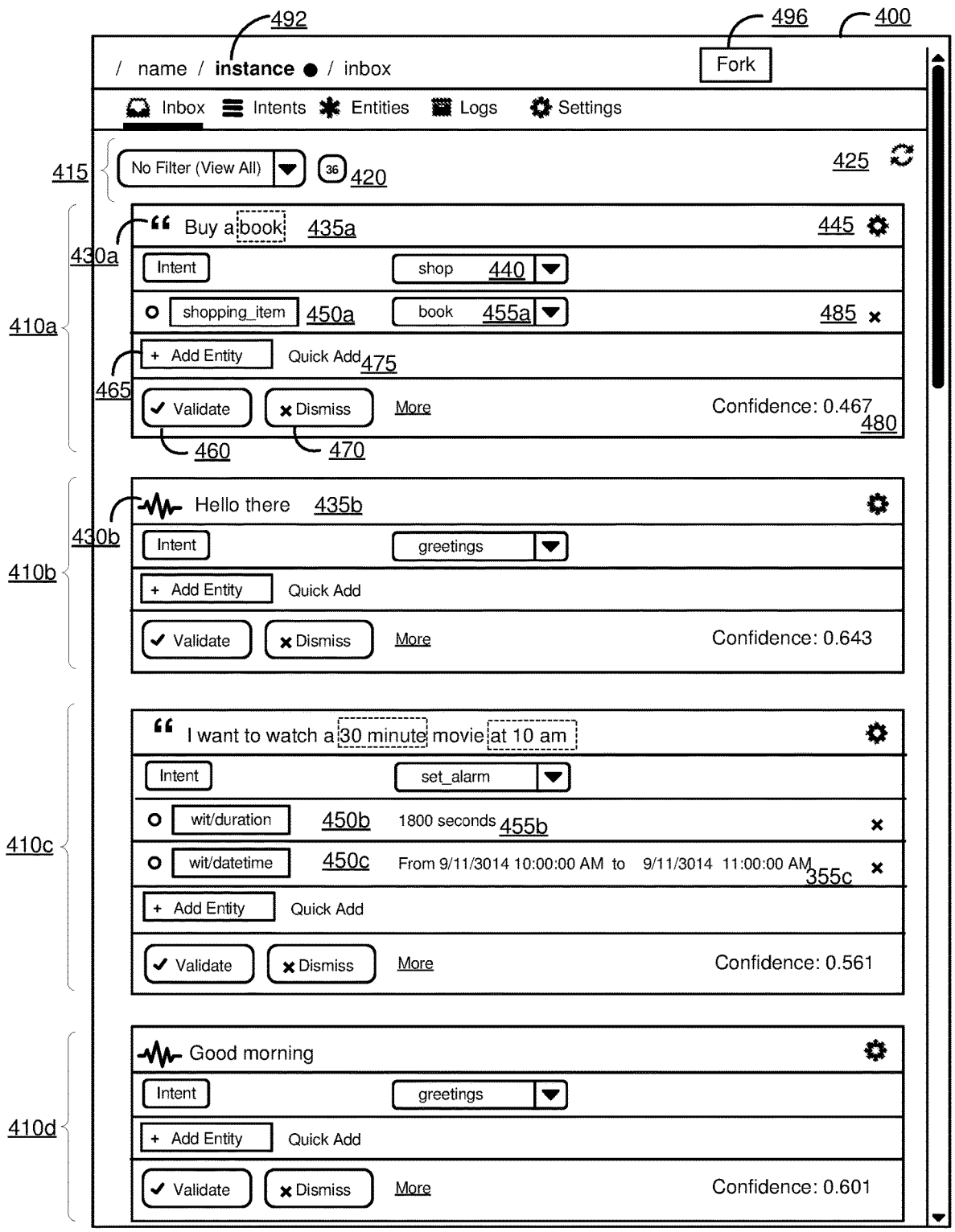
FIGS. 4-8 illustrate an email-like user interface displaying action panels corresponding to user logs provided by the NL configuration system, according to some embodiments.

FIG. 4 illustrates a user interface 300 of an inbox 160, according to an embodiment. The inbox 160 allow a developer to process a larger number of the user logs received by the developer platform 120. In some embodiments, the inbox 160 is displayed within a console window, e.g., a web console. The developer can select an action through a displayed action panel 310 of the inbox. The developer platform 120 then sends the selected action to the NL configuration system 130 for semi-supervised training of the NLU model 152 and in some embodiments the models of the speech recognition engine 140.

The displayed user interface 300 of the inbox 160 includes action panels 310a, 310b, 310c, a drop-down list 315 for filtering the inbox by intent or search the inbox for a particular intent. An indicator 320 displays the total number of action panels included in the inbox 160. In some embodiments, at most ten action panels are displayed at one time. In some embodiments, the number of displayed action panels in the console window can be changed by the user of the developer platform. Each action panels 310 displays a user log from a list of user logs. In some embodiments, an action panel 310 displays a group of user logs that were grouped together by the cluster module 166 as described below. The list is determined through filtering, sorting, and grouping of the user logs received by the developer platform 120 from the runtime system 112 or the application 114 when processing a natural language query.

Each displayed user log includes an expression 335 of a natural language query, the predicted intent 340 based on the query's expression 335, entities 350 associated with the intent, and the intent's confidence value 380. The action panel 310 displays the action buttons 360 and 370 to initiate a "validate" or "dismiss" action for the panel's combination of natural language expression and intent predicted by the NL configuration system. In some embodiments, the action selected by the developer may include other types of action in addition to the "validate" and "dismiss" action that are displayed for selection in an action panel. Upon selecting the validate button 360 or dismiss button 370 the action panel is removed from the inbox and the action module 168 sends the corresponding action to the NL configuration system 130 for updating the NLU model 152 and in some embodiments the models of the speech recognition engine 140.

Selecting an action from an action panel updates one or more NL models (i.e. NLU, acoustic and/or language model) and data contained within the NL configuration system in real-time. A "validate" action trains the NLU system 150 to recognize the combination of a natural language expression and an intent, including the intent's entity values. In some embodiments, a "validate" action trains the speech recognition engine 140 separately or in combination with training the NLU system 150. The intent represents a piece of program code or construct that the runtime system 112 and/or application 114 can interpret and/or execute. A "dismiss" action results in the NLU system 150 assigning the corresponding combination of expression and intent a low confidence value so that the combination has very little influence on the overall predictability of the NLU model. In some embodiments, selection of ten actions and submission to the NL configuration system results in automatically retraining the NLU model based on the selected actions. In some embodiments, the developer can optionally alter the number of actions that trigger a retraining of the NLU model and date. In some embodiments, retraining of the NLU model results in an update of the NLU configuration state, leading to changes on how the developer platform determines a list of user logs and displays the list in the inbox. Updates to the NL configuration system, including the NLU, acoustic and language models can improve the accuracy and latency of the runtime system 112 in processing a natural language query.

In some embodiments, the filter module 162 applies various filters to user logs received by the developer platform 120 to help the developer with efficiently training the NL configuration system. By filtering received user logs the filter module 162 determines a list of user logs for display in the inbox 160. For example, the filter module 162 analyzes attributes of the received user logs in view of characteristics of the existing NLU model and NL configuration state. Examples of attributes of user logs include the type of the log's expression and/or intent (e.g., question, request, command, etc.), the expression's form (e.g., textual or sound), the user and/or runtime system from which user log was received, the time when a user log was retrieved, and subject matter/category of the log's expression or intent (e.g., setting an alarm, controlling devices, sending greetings, weather or traffic information, etc.). In some embodiments, a user log's attribute includes the frequency and/or confidence score of a similar expression or a similar expression/intent combination within the NLU model and NL configuration state. In some embodiments, the frequency and/or confidence score of a similar expression or expression/intent combination is based on instances including such an expression or combination within the network of instances 172. In some embodiments, the drop-down list 315 for filtering the inbox presents the attributes of the user log to the developer to be selected as a filtering criterion.

In some embodiments, user logs are ranked according to their significance on improving the accuracy and/or other modeling criteria of the NLU model 152. In some embodiments, the filter module 162 filters out user logs ranked below a threshold that can be specified by the developer through the drop-down list 315. For example, user logs scored with a very high confidence as calculated by the NLU system 150 and in case of sound expressions as calculated by the speech recognition engine 140 using the acoustic and language models possess very little significance for accuracy and/robustness for the model, since the model is already well trained on them, and are therefore filtered out by the filter module 162. Another example includes user insults that the filter module 162 removes from the inbox 160, preventing insults from entering the training of the NLU model 152.

In some embodiments, the cluster module 164 groups user logs of the inbox's list of user logs together based on user-specified cluster criteria. This grouping of user logs and displaying user groups according to groups in the inbox allows the developer to process a maximum number of user logs through triggering a single action for a group, e.g. validating all grouped user logs. In some embodiments, even after the filter module 162 applies multiple filter criteria to the received user logs, the inbox's list of user logs still contains millions of user logs. In some embodiments, grouping is based on a similarity measure of the user logs, meaning similar logs are group together. The Similarity may be measured based on the similarity of the expression or intent included in a user log. For example, an expression or intent belonging to the same type or category, as described with reference to the filtering user logs, receives a higher similarity score. In some embodiments, user logs that include the identical expression or identical intent score the highest similarity. In some embodiments, the similarity of user logs is based on the textual or sound similarity between the user log's expressions. In some embodiments, the similarity of user logs is based on the similarity in textual strings representing intents of two user logs. For example, a "set_alarm" intent is similar to a "set_wakeup_call" intent.

In some embodiments, grouping is performed based on time stamps associated with the user logs. User logs from the same device and with time stamps generated on the device within a short time period receive a high similarity score and are therefore grouped together. In particular, user logs generated on the device within a short time period very likely represent user queries that express the same intent by the user regardless of the intent predicted by the NL configuration system. In some embodiments, the grouping of user logs that include sound expressions is based on actions taken by other developers on similar user logs generated from other instances within network of instances 172. This improves the accuracy of grouping of such user logs if the speech recognition system 140 returns a low confidence value after processing the user log's sound expression. In some embodiments, other grouping algorithms can be added and employed by the cluster module 164.

In some embodiments, the sort module 166 sorts inbox's list of user logs and the corresponding action panels 310 by rank that may be based on the impact on the NL configuration system's accuracy and robustness. In some embodiments, an action panel for a user log with a higher confidence is ranked lower, and thus the corresponding action panel displayed at lower position in the inbox view compared to action panels associated with a higher ranking user log. In some embodiments, the sort module 166 sorts groups of user logs obtained from the cluster module 164 after the logs have been grouped. The rank of a group of user logs can be based on the average rank of each user log included in the group. In some embodiments, the sort module 166 orders groups based on the groups' impact scores on the NLU model's accuracy and robustness if an action is triggered for a particular group. In case of sound expressions included in the user logs of a group, the sort module 166 also considers the group's impact scores on the accuracy and robustness of the acoustic and language models when ordering groups. The impact score equals the estimated gain of accuracy and robustness divided by the estimated cost (in seconds) of the triggering the action. Higher scoring groups are ranked higher than lower scoring groups with their corresponding action panels displayed at a higher position in the inbox view.

In response to sending (triggering) a "validate" or "dismiss" action for one of the action panels 310, the corresponding action panel is removed from the inbox. In some embodiments, if all displayed action panels have been removed, the display of the inbox reloads and ten new action panels are displayed in an order sorted based on the updated configuration state of the NL configuration system and any newly received user logs. In some embodiments, the developer reloads the display of the inbox by selecting the reload indicator 325, e.g. through clicking at a location close to the reload indicator on the console window.

As shown in FIG. 4, in some embodiments, an action panel 310 includes an expression-type indicator 330. The indicator 330 shows if the user expression includes a textual expression 330a or sound expression 330b. The expression field 335 displays the textual expression 335a of the query or the textual transcription 335b of the sound expression from the speech recognition system 165. In some embodiments, the display is configured to allow playing the sound expression over a connected speaker by selecting, e.g., clicking on, the indicator 330b. As described above, in some embodiments, after listening to the sound expression the developer can validate or dismiss the textual expression generated (transcribed) by the speech recognition engine and displayed along with the sound expression in the inbox. In some embodiments, the developer can edit the textual expression generated from the sound expression before validating the edited textual expression. In some embodiments, the developer can tag sound expression for particular characteristics of the expression, e.g., the speaker's emotions or identity, or the speech recognition engine automatically detects these characteristics and displays them to the developer in the inbox, e.g., as an emotion icon, along with the sound expression for validation or dismissal.

In some embodiments, the action panel 310 displays the suggested intent 340 and a modify button 345 for modifying the displayed expression 335. In some embodiments, the edit button 345 allows the developer to edit and correct the expression 335. In some embodiments, selecting the modify button 345 displays an option list that includes options for "editing," "copying," "previewing the API output," and "reporting" the expression. The displayed intent 340 is based on the program code/construct generated by the NL configuration system for the user-supplied expression 335.

In some embodiments, the user interface 300 of an inbox 160 includes a fork button 396. Upon selection of the fork button 396, the developer platform 120 issues a fork command to fork the instance 392 in the NL configuration system 130. In some embodiments, updates to a forked instance are reported to owner and developers who have been granted access to the forked instance. The NL configuration system 130 maintains a copy of the configuration state of the forked instance at the time of issuing fork command. In some embodiments, maintain a copy of configuration state includes creating a copy of the NLU model 152 and the data underlying the NLU model.

Figure 5:
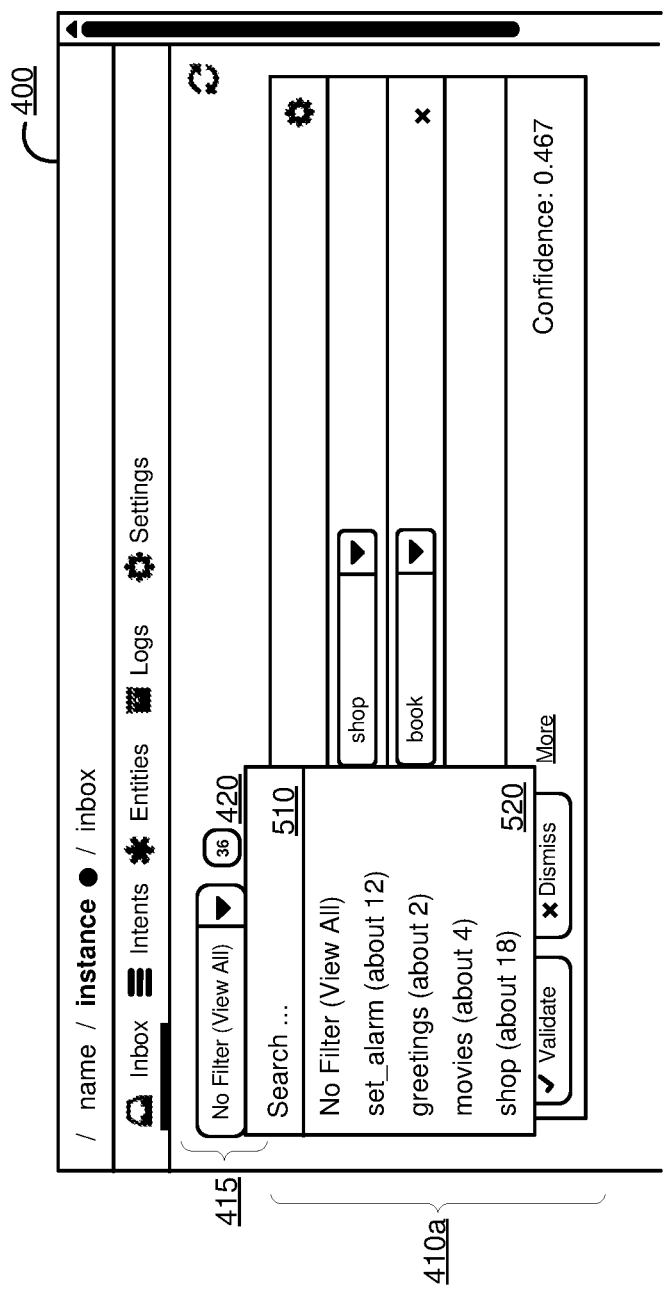

As shown in FIG. 5, in some embodiments, a drop-down list 315 for filtering the inbox by intent or search the inbox for a particular intent is displayed. A search field 410 allows for searching for a particular intent available from the NL configuration system. Selecting an intent from the intent list 420 limits the display to action panels corresponding to the selected intent. The number displayed next to each listed intent indicates the number of user logs including the corresponding intent.

Referring back to FIG. 4, in some embodiments, the action panel displays one or more entities fields, including the entity 350 and their corresponding entity values 355 based on the displayed intent 340 and the NL configuration state. For example, if the NL configuration system determines that an expression represents a "shop" intent and identifies the corresponding "shopping_item" entity for the "shop" intent, the action panel displays both the intent "shop" and the entity "shopping_item" with the identified shopping_item value.

Figure 6:
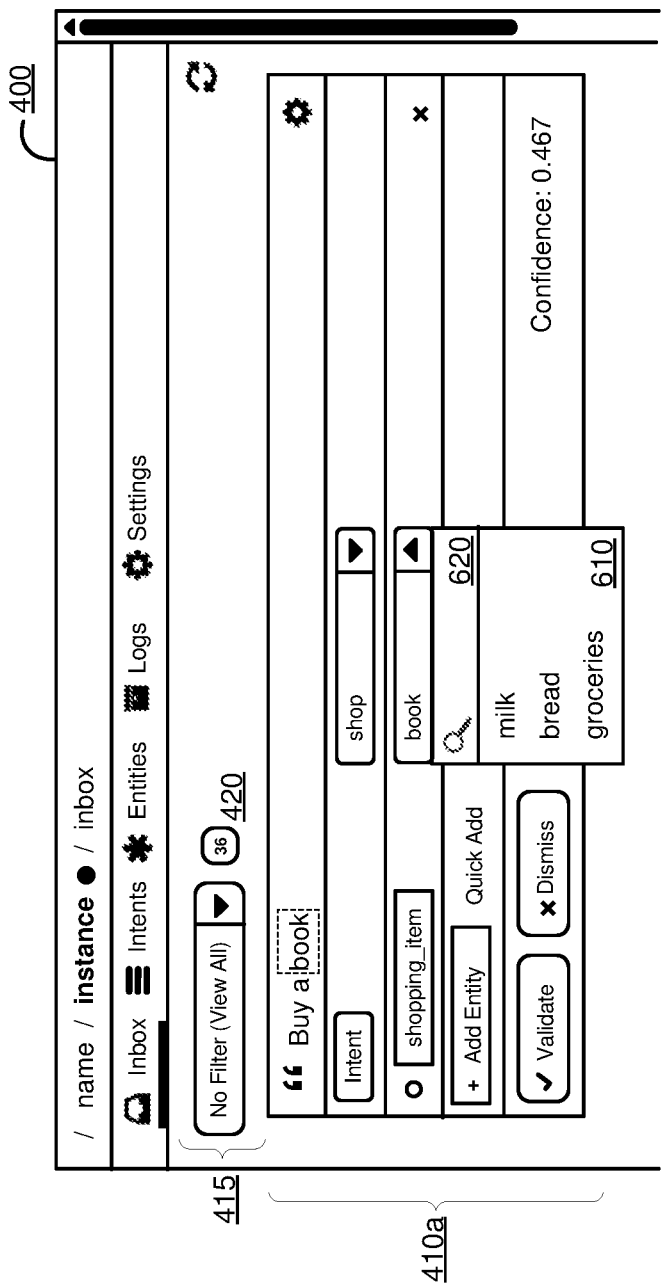

As shown in FIG. 6, for some entities, a drop-down list allows to change to a listed entity field value 510 or search 520 available entity values, according to an embodiment. In some embodiments, selecting word or characters in the expression 335 that are not already identified with a displayed entity changes the value to the selected words. A color coding of words or characters within an expression visually associates those words or characters with an entity of the action panel, shown in FIG. 3 as dash-lined rectangles within an expression. Add entity button 365 and quick add button 375 allow the developer to add additional entities and their values to the displayed intent 340. A delete button 385 allows the developer to remove the corresponding entity from the displayed intent 340.

Figure 7:
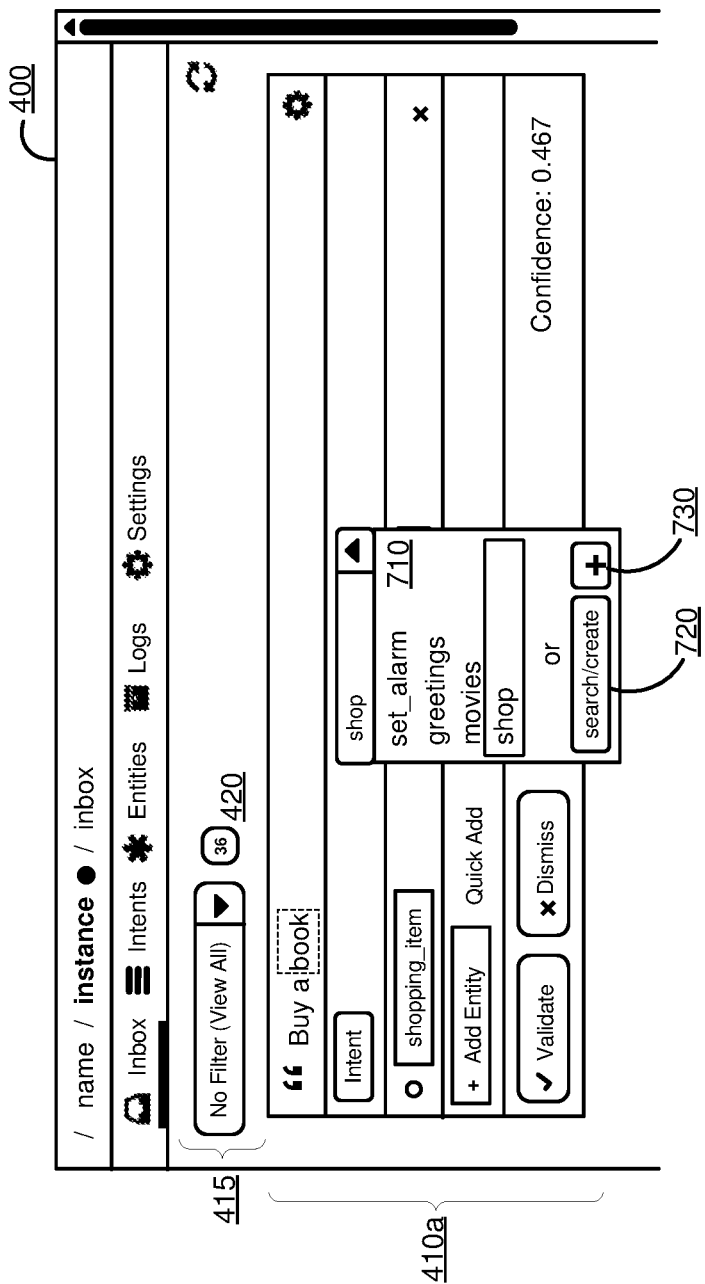

As shown in FIG. 7, in some embodiments, a drop-down list 610 of intents that are available in the NL configuration system is displayed if the intent 340 is selected, e.g., by clicking on it. In some embodiments, the drop-down list includes options 620 and 630 to search or create a new intent. The developer can accept the suggested intent, select an existing one or create a new intent through the drop-down list 610.

Figure 8:
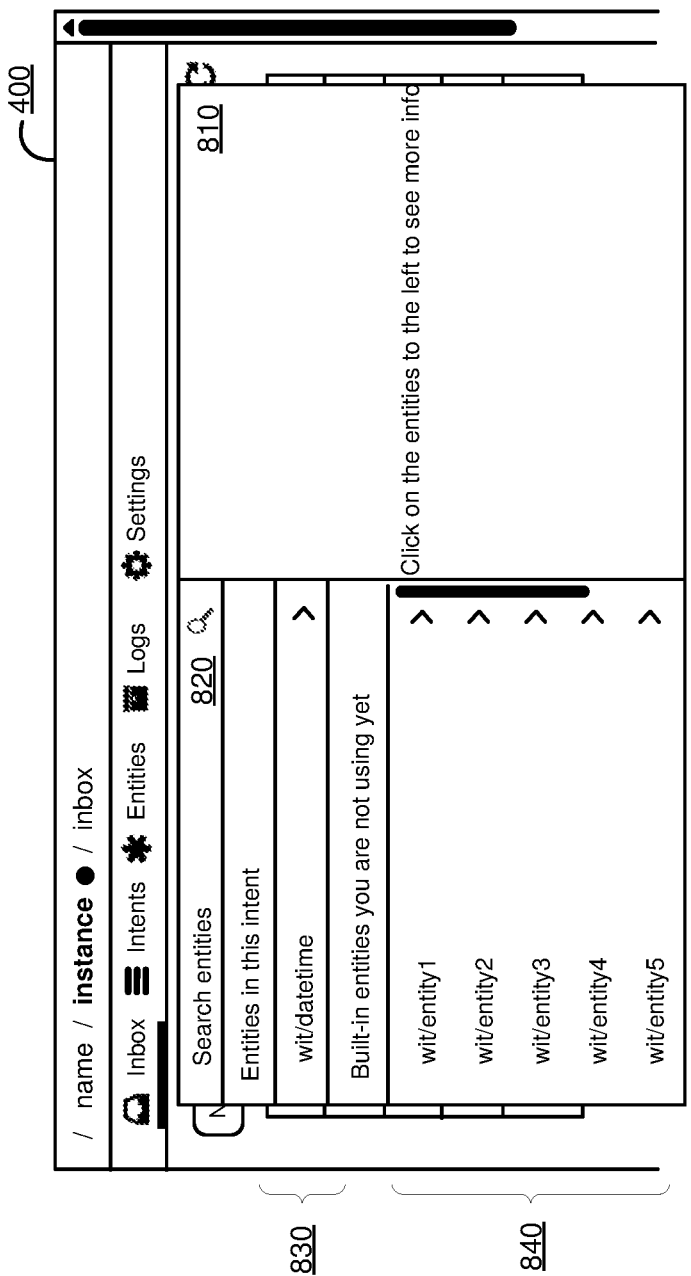

As shown in FIG. 8, in some embodiments, upon selection of the entity button 365 of an action panel 310 an entity selection panel 710 is displayed in the inbox view. The entity selection panel 710 includes a search field 720 that allows the developer to enter a search term for obtaining a selection of entities. Furthermore, the entity selection panel 710 displays for selection by the developer a list of entities 730 that are associated with the intent of the action panel 710. Additionally, the entity selection panel 710 displays for selection by the developer a list of standard entities 740 that are built-in to the NL configuration system.

Using Inbox to Training Natural Language Configuration System

Figure 9:
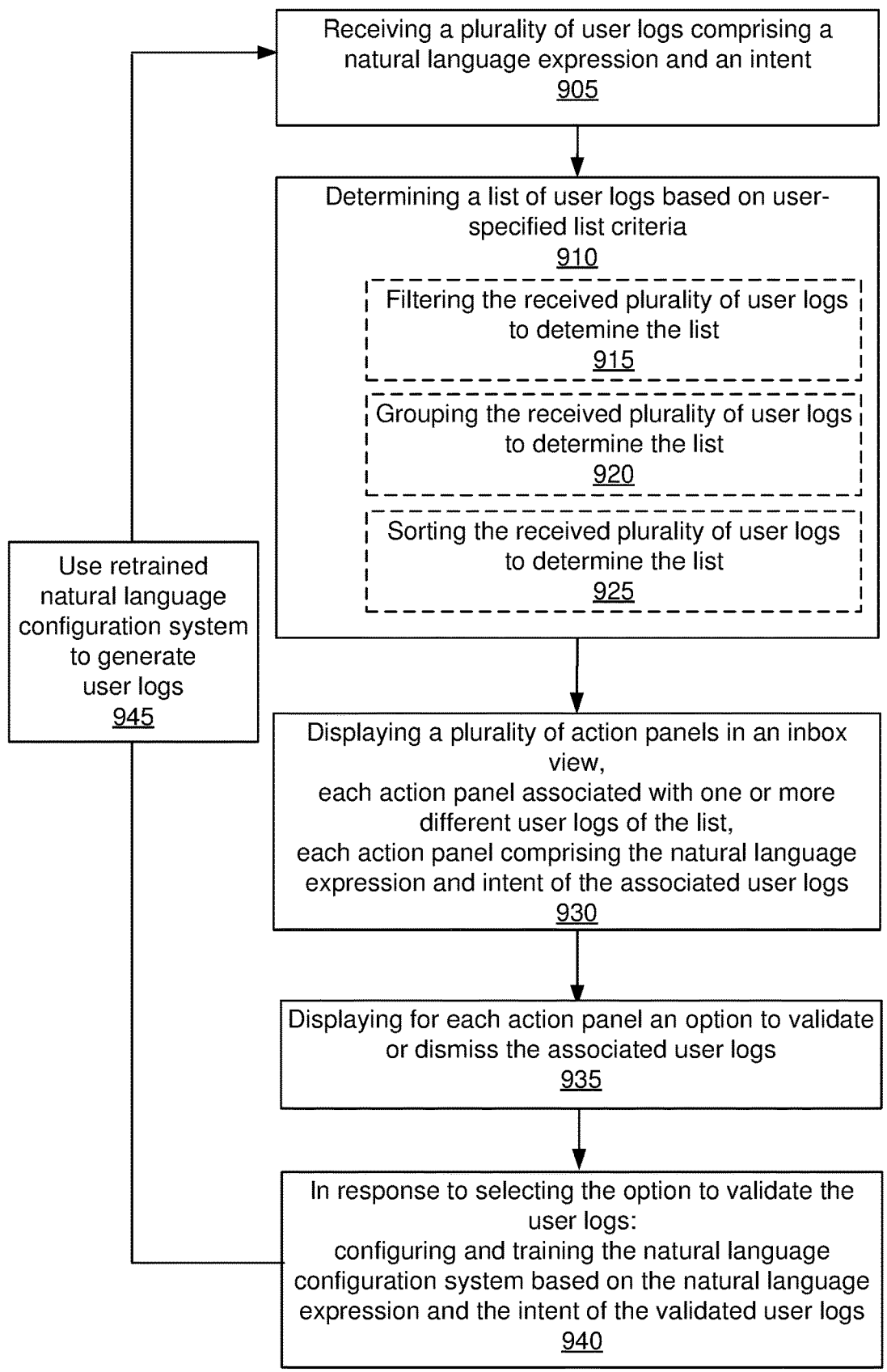
FIG. 9 illustrates a flow chart of a method for configuring and training a natural language configuration system using an email-like user interface displaying user logs, according to an embodiment.

FIG. 9 is a flow chart illustrating a method for configuring and training a natural language configuration system using an email-like user interface displaying user logs, according to an embodiment. The developer platform 120 receives 805 a plurality of user logs from the runtime system 112 or the application 114 in the NL language environment 100, as shown in FIG. 1A. Each user log includes a natural language expression of a user query and the intent predicted by the NL configuration system 130. The inbox 160 of the developer platform 120 determines 810 a list of user logs from the received user logs based on user-specified list criteria. List criteria, for example, include attributes of a user log that qualify the user log to be included in the list. In some embodiments, list criteria determine the order use logs are included in the list. In some embodiments, the determining of the list comprises filtering 815 the received user logs based on user-specified filter criteria as described with reference to FIG. 4. In some embodiments, the determining of the list comprises grouping 820 the received user logs into logs based on user-specified grouping criteria as described with reference to FIG. 4. In some embodiments, the determining of the list comprises sorting 825 the received user logs based on user-specified sorting criteria as described with reference to FIG. 4.

The method further includes the developer platform 120 displaying 830 a plurality of action panels with each action panel being associated with one or more different user log of the determined list and comprising natural language expression and intent of the associated user log. For each action panel an option to validate or dismiss the associated one or more user log is displayed 835 in the inbox view. In response to the developer selecting the option to validate the user log, the NL language system is configured and trained 840 based on the natural language expression and intent of the validated user log. Future user logs are generated using 845 the retrained NL configuration system before being received by the developer platform 120.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   maintaining, by a configuration system, a developer account for each of a plurality of separate natural language applications, each natural language application having:
      computer program code within the application for invoking each a plurality of different application functions,
      a mapping module coupled to the computer program code, the mapping module configured to map a natural language input to an application function of the plurality of application functions of the computer program code, and
      a set of example natural language strings, each example defining which application function of the plurality of application functions is to be invoked by the example natural language string, wherein the set of example natural language strings of each separate natural language application is different relative to other natural language applications of the plurality of natural language applications;
   receiving, by the configuration system, a request from an application developer to use the set of example natural language strings of one or more other accounts of other natural language applications maintained by the configuration system to train the mapping module of the natural language application of an account of the application developer; and
   training the mapping module of the natural language application of the account of the application developer using the set of example natural language strings in the account of the application developer and the sets of example natural language strings in the one or more other accounts,
   wherein the trained mapping module is coupled to the computer program code of the natural language application and is configured to invoke an application function from the plurality of different application functions of the natural language application in response to a natural language input received by the natural language application.

2. The computer-implemented method of claim 1, further comprising:
   ranking, by the configuration system, each natural language string in the sets of example natural language strings in the one or more other accounts based on a number of the plurality of natural language applications to which the natural language string is mapped.

3. The computer-implemented method of claim 1, wherein the request is provided by the application developer as a natural language string.

4. The computer-implemented method of claim 3, further comprising:
   comparing, by the configuration system, the natural language string to each example natural language string of the sets of example natural language strings in other accounts of other natural language applications maintained by the configuration system; and
   identifying, by the configuration system, the sets of example natural language strings in the one or more other accounts based on a similarity of each of the sets of example natural language strings in the one or more other accounts to the natural language string provided by the application developer.

5. The computer-implemented method of claim 4, further comprising:
   displaying, by the configuration system, a list of the sets of example natural language strings in the one or more other accounts to the application developer in a user interface.

6. A computer-implemented method comprising:
   maintaining, by a configuration system, an account for each of a plurality of natural language applications, each natural language application having:
      computer program code within the application for invoking each a plurality of different application functions,
      a machine learning model coupled to the computer program code, the machine learning model configured to receive a natural language input and output to the computer program code a prediction of which application function is to be invoked by the natural language application in response to the received natural language input, and a set of training data comprising a plurality of examples, each example identifying a natural language input and a corresponding application function of the plurality of application functions to be invoked by the natural language input, wherein the set of example natural language strings of each separate natural language application is different relative to other natural language applications of the plurality of natural language applications;

receiving, by the configuration system, a request from an application developer to use the set of training data of one or more other accounts to train the machine leaning model of the natural language application of an account of the application developer; and training the machine learning model of the natural language application of the account of the application developer using the set of training data in the account of the application developer and the sets of training data in the one or more other accounts, wherein the trained model is coupled to the computer program code of the natural language application and is configured to invoke an application function from the plurality of different application functions of the natural language application in response to a natural language input received by the natural language application.

7. The computer-implemented method of claim 6, further comprising:

ranking, by the configuration system, each natural language string in the sets of example natural language strings in the one or more other accounts based on a number of the plurality of natural language applications to which the natural language string is mapped.

8. The computer-implemented method of claim 6, wherein the request is provided by the application developer as a natural language string.

9. The computer-implemented method of claim 8, further comprising:

comparing, by the configuration system, the natural language string to each example natural language string of the sets of example natural language strings in other accounts of other natural language applications maintained by the configuration system; and identifying, by the configuration system, the sets of example natural language strings in the one or more other accounts based on a similarity of each of the sets of example natural language strings in the one or more other accounts to the natural language string provided by the application developer.

10. The computer-implemented method of claim 9, further comprising:

displaying, by the configuration system, a list of the sets of example natural language strings in the one or more other accounts to the application developer in a user interface.

11. A non-transitory computer-readable storage medium including instructions that, when executed by a processor, causes the processor to:

maintain, by a configuration system, an account for each of a plurality of natural language applications, each natural language application having:

computer program code within the application for invoking each a plurality of different application functions, a mapping module coupled to the computer program code, the mapping module configured to map a natural language input to an application function of the plurality of application functions of the computer program code, and a set of example natural language strings, each example defining which application function of the plurality of application functions is to be invoked by the example natural language string;

receive, by the configuration system, a request from an application developer to use the set of example natural language strings of one or more other accounts of other natural language applications maintained by the configuration system to train the mapping module of the natural language application of an account of the application developer; and train the mapping module of the natural language application of the account of the application developer using the set of example natural language strings in the account of the application developer and the sets of example natural language strings in the one or more other accounts, wherein the trained mapping module is coupled to the computer program code of the natural language application and is configured to invoke an application function from the plurality of different application functions of the natural language application in response to a natural language input received by the natural language application.

12. The non-transitory computer-readable storage medium of claim 11, wherein the instructions that, when executed by the processor, further cause the processor to:

rank, by the configuration system, each natural language string in the sets of example natural language strings in the one or more other accounts based on a number of the plurality of natural language applications to which the natural language string is mapped.

13. The non-transitory computer-readable storage medium of claim 11, wherein the request is provided by the application developer as a natural language string.

14. The non-transitory computer-readable storage medium of claim 13, wherein the instructions that, when executed by the processor, further cause the processor to:

compare, by the configuration system, the natural language string to each example natural language string of the sets of example natural language strings in other accounts of other natural language applications maintained by the configuration system; and identify, by the configuration system, the sets of example natural language strings in the one or more other accounts based on a similarity of each of the sets of example natural language strings in the one or more other accounts to the natural language string provided by the application developer.

15. The non-transitory computer-readable storage medium of claim 14, wherein the instructions that, when executed by the processor, further cause the processor to:

display, by the configuration system, a list of the sets of example natural language strings in the one or more other accounts to the application developer in a user interface.

* * * * *

UNITED STATES PATENT AND TRADEMARK OFFICE
CERTIFICATE OF CORRECTION

PATENT NO. : 10,847,139 B1
APPLICATION NO. : 16/667606
DATED : November 24, 2020
INVENTOR(S) : Lebrun Page 1 of 1

It is certified that error appears in the above-identified patent and that said Letters Patent is hereby corrected as shown below:

In the Claims

Column 21, Line 12, Claim 6, delete "one or more other accounts to train the machine leaning model" and insert -- one or more other accounts to train the machine learning model --.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*